US008974969B2

(12) United States Patent
Kameda et al.

(10) Patent No.: US 8,974,969 B2
(45) Date of Patent: Mar. 10, 2015

(54) NEGATIVE ELECTRODE MATERIAL FOR NONAQUEOUS ELECTROLYTE SECONDARY BATTERY, AND NONAQUEOUS ELECTROLYTE SECONDARY BATTERY USING THE SAME

(75) Inventors: Takashi Kameda, Ibaraki (JP); Hideharu Sato, Ibaraki (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 13/242,608

(22) Filed: Sep. 23, 2011

(65) Prior Publication Data

US 2012/0064403 A1    Mar. 15, 2012

Related U.S. Application Data

(63) Continuation of application No. PCT/JP2010/055423, filed on Mar. 26, 2010.

(30) Foreign Application Priority Data

Mar. 27, 2009    (JP) ................. 2009-079950

(51) Int. Cl.
```
H01M 4/13       (2010.01)
H01M 4/58       (2010.01)
H01M 4/02       (2006.01)
H01M 10/0525    (2010.01)
H01M 4/587      (2010.01)
H01M 4/485      (2010.01)
H01M 4/505      (2010.01)
H01M 4/525      (2010.01)
H01M 10/0566    (2010.01)
```
(52) U.S. Cl.
CPC .......... *H01M 10/0525* (2013.01); *H01M 4/587* (2013.01); *H01M 4/485* (2013.01); *H01M 4/505* (2013.01); *H01M 4/525* (2013.01); *H01M 4/581* (2013.01); *H01M 10/0566* (2013.01); *Y02E 60/122* (2013.01); *Y02T 10/7011* (2013.01)
USPC ....................... 429/231.8; 429/218.1; 429/209

(58) Field of Classification Search
None
See application file for complete search history.

(56) References Cited

U.S. PATENT DOCUMENTS

| | | | |
|---|---|---|---|
| 6,403,259 B1 | 6/2002 | Kitagawa et al. | |
| 6,455,199 B1 | 9/2002 | Kitagawa et al. | |
| 6,632,569 B1 * | 10/2003 | Kameda et al. | ............ 429/231.8 |
| 7,052,803 B2 | 5/2006 | Kato et al. | |
| 2005/0058904 A1 | 3/2005 | Kano et al. | |
| 2010/0015514 A1 | 1/2010 | Miyagi et al. | |

FOREIGN PATENT DOCUMENTS

| | | | |
|---|---|---|---|
| CN | 1261729 A | 8/2000 | |
| CN | 1610176 A | 4/2005 | |
| JP | 5-307977 | 11/1993 | |
| JP | 11-45715 | 2/1999 | |
| JP | 11-54123 | 2/1999 | |
| JP | 2000-340232 | * 12/2000 | ............. H01M 4/58 |
| JP | 3291756 | 10/2002 | |
| JP | 2004-79344 | 3/2004 | |
| JP | 2004-127913 | 4/2004 | |
| JP | 3534391 | 6/2004 | |
| JP | 2004-253379 | 9/2004 | |
| JP | 2004-335302 | 11/2004 | |
| JP | 2005-71679 | 3/2005 | |
| JP | 2005-158718 | 6/2005 | |
| JP | 2005-294011 | 10/2005 | |
| JP | 2007-169160 | 7/2007 | |
| JP | 2007-180025 | 7/2007 | |
| JP | 2007-191389 | 8/2007 | |
| JP | 2007-305626 A | 11/2007 | |
| JP | 2008-305661 | 12/2008 | |

OTHER PUBLICATIONS

English translation of Kameda (JP 2000-340232).*
U.S. Appl. No. 13/241,384, filed Sep. 23, 2011, Kameda, et al.
International Search Report issued Jun. 29, 2010, in PCT/JP2010/055423 with English translation.
Chinese Office Action issued Apr. 28, 2014, in China Patent Application No. 201080013295.6 (with English translation).
Combined Chinese Office Action and Search Report issued Sep. 3, 2013 in Patent Application No. 201080013295.6 (with partial English language translation).
U.S. Appl. No. 13/853,641, filed Mar. 29, 2013, Kameda, et al.
Japanese Office Action issued Mar. 4, 2014 in Patent Application No. 2010-073163 with English Translation.

* cited by examiner

*Primary Examiner* — Yoshitoshi Takeuchi
(74) *Attorney, Agent, or Firm* — Oblon, McClelland, Maier & Neustadt, L.L.P.

(57) ABSTRACT

A mixed carbon material is useful for an electrode of a nonaqueous secondary battery. The material has two component materials: carbon material A and carbon material B. Both materials have high capacity and rapid charge-discharge characteristics. Carbon material A, a multilayer-structure material containing an amorphous carbon covering the surface of a graphitic particle, has particularly excellent charging-discharging properties. Carbon material B has particularly excellent electrical conductivity properties. A battery with an electrode having the mixed carbon material can have both rapid charge-discharge characteristics and high cycle characteristics.

20 Claims, No Drawings

NEGATIVE ELECTRODE MATERIAL FOR NONAQUEOUS ELECTROLYTE SECONDARY BATTERY, AND NONAQUEOUS ELECTROLYTE SECONDARY BATTERY USING THE SAME

TECHNICAL FIELD

The present invention relates to a negative electrode material of a nonaqueous electrolyte secondary battery. The present invention also relates to a negative electrode for nonaqueous electrolyte secondary battery using the negative electrode material, and a nonaqueous electrolyte secondary battery having the negative electrode.

BACKGROUND ART

A nonaqueous lithium secondary battery comprising positive and negative electrodes capable of storing/releasing lithium ion and a nonaqueous electrolytic solution having dissolved therein a lithium salt such as $LiPF_6$ and $LiBF_4$ has been developed and is used in practice.

Various materials have been proposed as the negative electrode material of this battery, but in view of high capacity and excellent flatness of discharge potential, a graphitic carbon material such as natural graphite, artificial graphite obtained by graphitizing coke or the like, graphitized mesophase pitch, and graphitized carbon fiber is used.

Also, an amorphous carbon material is used because this is relatively stable to some electrolytic solutions. In addition, a carbon material imparted with properties of both graphite and amorphous carbon by coating or attaching amorphous carbon on the surface of a graphitic carbon particle is also used.

In Patent Document 1, a spheroidized graphitic carbon material enhanced in the rapid charge-discharge characteristics by applying a mechanical energy treatment to a gaphitic carbon particle that is originally in a flake, scale or plate form, to give a damage to the graphitic particle surface and at the same time, spheroidize the particle is used, and it is further proposed to use a spheroidized carbon material having a multilayer structure, which has the properties of graphite and amorphous carbon by virtue of coating or attaching amorphous carbon on the surface of the spheroidized graphitic carbon particle and simultaneously has rapid charging-discharging property.

However, in recent years, the application of an aqueous lithium secondary battery is expanding, and a nonaqueous lithium secondary battery having higher rapid charging-discharging property than ever before and at the same time, having high cycle characteristics is demanded in use for electric power tools, electric cars and the like, in addition to conventional use for notebook-size personal computers, mobile communication equipment, portable cameras, portable game machines and the like.

With respect to improvement of the cycle characteristics, for example, Patent Document 2 has proposed a nonaqueous lithium secondary battery using, as negative electrode materials, a carbonaceous material particle having a multilayer structure, where the R value obtained from the Raman spectrum is 0.2 or more, and an amorphous carbonaceous particle having low crystallinity, where the X-ray interplanar spacing d002 is from 3.36 to 3.60 Å.

However, this battery has a problem that the irreversible capacity attributable to the amorphous carbon particle is increased, and more improvements are needed on the cycle characteristics and rapid charge-discharge characteristics required of the recent lithium secondary battery.

Also, Patent Document 3 has proposed a negative electrode material composed of a mixture of a coated graphite particle whose surface is covered with amorphous carbon, and a non-coated graphite particle whose surface is not covered with amorphous carbon.

In the description of Patent Document 3, it is stated that the non-coated graphite particle indicates a graphite particle where the ratio [I1360/I1580] of the peak intensity (I1360) near 1,360 $cm^{-1}$ to the peak intensity (I1580) near 1,580 $cm^{-1}$ in argon laser Raman spectrometry at a wavelength of 5,145 Å is 0.10 or less.

In Patent Document 3, it is also stated that the coated graphite particle indicates a graphite particle where the ratio [I1360/I1580] of the peak intensity (I1360) near 1,360 $cm^{-1}$ to the peak intensity (I1580) near 1,580 $cm^{-1}$ in argon laser Raman spectrometry at a wavelength of 5,145 Å is from 0.13 to 0.23.

RELATED ART

Patent Document

Patent Document 1: Japanese Patent No. 3534391
Patent Document 2: Japanese Patent No, 3291756
Patent Document 3: JP-A-2005-294011 (the term "JP-A" as used herein means an "unexamined published Japanese patent application")

SUMMARY OF THE INVENTION

Problems that the Invention is to Solve

According to the studies by the present inventors, use of a negative electrode material obtained by mixing a non-coated graphite particle where the ratio [I1360/I1580] of the peak intensity (I1360) near 1,360 $cm^{-1}$ to the peak intensity (I1580) near 1,580 $cm^{-1}$ in argon laser Raman spectrometry at a wavelength of 5,145 Å is 0.10 or less, and a coated graphite particle where the ratio [I1360/I1580] of the peak intensity (I1360) near 1,360 $cm^{-1}$ to the peak intensity (I1580) near 1,580 $cm^{-1}$ in argon laser Raman spectrometry at a wavelength of 5,145 Å is from 0.13 to 0.23, has failed in achieving the targeted high capacity, rapid charging-discharging property and cycle characteristics sought by the present inventors.

Accordingly, an object of the present invention is to propose a negative electrode material for nonaqueous electrolyte secondary battery, having high capacity and satisfying both rapid charge-discharge characteristics and high cycle characteristics, which is suited also for the recent application to electric power tools or electric cars.

Means for Solving the Problems

As a result of intensive studies to attain the above-described object, the present inventors have found that when a negative electrode material containing two kinds of carbon materials, that is, carbon material A and carbon material B, differing in the role is used, an electrode for nonaqueous electrolyte secondary battery, satisfying both rapid charge-discharge characteristics and cycle characteristics, can be obtained and those problems can be solved.

A material excellent particularly in the rapid charging-discharging property is selected for the carbon material A, and a material excellent particularly in the electrical conductivity is selected for the carbon material B. However, both the carbon material A and the carbon material B must be a carbon material having both high capacity and rapid charge-discharge characteristics.

The carbon material A having both high capacity and rapid charge-discharge characteristics and being excellent particularly in the rapid charge-discharge characteristics is a multilayer-structure carbon material containing a spheroidized graphitic particle and an amorphous carbon covering the surface thereof, which is a carbon material where the interplanar spacing (d002) of 002 planes by the wide-angle X-ray diffraction method is 3.37 Å or less, Lc is 900 Å or more, the tap density is 0.8 g/cm$^3$ or more, and the Raman R value that is a ratio of the peak intensity near 1,360 cm$^{-1}$ to the peak intensity near 1,580 cm$^{-1}$ in the argon ion laser Raman spectrum is from 0.25 to 0.6.

The carbon material B having both high capacity and rapid discharge characteristics and being excellent particularly in the electron conductivity is a carbon material where the interplanar spacing (d002) of 002 planes by the wide-angle X-ray diffraction method is 3.37 Å or less, Lc is 900 Å or more, the tap density is 0.8 g/cm$^3$ or more, and the Raman R value that is a ratio of the peak intensity near 1,360 cm$^{-1}$ to the peak intensity near 1,580 cm$^{-1}$ in the argon ion laser Raman spectrum is from 0.11 to 0.2.

That is, the present invention is as follows.

1. A negative electrode material for nonaqueous electrolyte secondary battery, comprising the following carbon material A and carbon material B:
(Carbon Material A)
a multilayer-structure carbon material containing a graphitic particle and an amorphous carbon covering the surface of the graphitic particle, which is a carbon material where the interplanar spacing (d002) of 002 planes by the wide-angle X-ray diffraction method is 3.37 Å or less, Lc is 900 Å or more, the tap density is 0.8 g/cm$^3$ or more, and the Raman R value that is a ratio of the peak intensity near 1,360 cm$^{-1}$ to the peak intensity near 1,580 cm$^{-1}$ in the argon ion laser Raman spectrum, is from 0.25 to 0.6,
(Carbon Material B)
a carbon material where the interplanar spacing (d002) of 002 planes by the wide-angle X-ray diffraction method is 3.37 Å or less, Lc is 900 Å or more, the tap density is 0.8 g/cm$^3$ or more, and the Raman R value that is a ratio of the peak intensity near 1,360 cm$^{-1}$ to the peak intensity near 1,580 cm$^{-1}$ in the argon ion laser Raman spectrum, is from 0.11 to 0.2.

2. The negative electrode material for nonaqueous electrolyte secondary battery as described in 1 above, wherein the ratio in the average particle diameter between the carbon material A and the carbon material B (average particle diameter of carbon material A/average particle diameter of carbon material B) is from 0.7 to 1.3.

3. The negative electrode material for nonaqueous electrolyte secondary battery as described in 1 or 2 above, wherein the ratio of the carbon material B is from 30 to 70 wt % based on the total amount of the carbon material A and the carbon material B.

4. The negative electrode material for nonaqueous electrolyte secondary battery as described in any one of 1 to 3 above, wherein in the graphitic particle used for the carbon material (A), the interplanar spacing (d002) of 002 planes by the wide-angle X-ray diffraction method is 3.37 Å or less, Lc is 900 Å or more, the tap density is 0.8 g/cm$^3$ or more, and the Raman R value that is a ratio of the peak intensity near 1,360 cm$^{-1}$ to the peak intensity near 1,580 cm$^{-1}$ in the argon ion laser Raman spectrum, is from 0.2 to 0.5.

5. The negative electrode material for nonaqueous electrolyte secondary battery as described in any one of 1 to 4 above, wherein the carbon material (B) is a multilayer-structure carbon material containing a spheroidized graphitic particle and a gaphitic carbon covering the surface of the spheroidized graphitic particle.

6. The negative electrode material for nonaqueous electrolyte secondary battery as described in 5 above, wherein in the spheroidized graphitic carbon, the interplanar spacing (d002) of 002 planes by the wide-angle X-ray diffraction method is 3.37 Å or less, Lc is 900 Å or more, the tap density is 0.8 g/cm$^3$ or more, and the Raman R value that is a ratio of the peak intensity near 1,360 cm$^{-1}$ to the peak intensity near 1,580 cm$^{-1}$ in the argon ion laser Raman spectrum, is from 0.2 to 0.5.

7. The negative electrode material for nonaqueous electrolyte secondary battery as described in any one of 1 to 6 above, wherein the specific surface area of the carbon material A is from 0.5 to 8 m$^2$/g.

8. The negative electrode material for nonaqueous electrolyte secondary battery as described in any one of 1 to 7 above, wherein the average degree of circularity of the graphitic particle used for the carbon material A as determined by a flow-type particle analyzer is 0.88 or more.

9. The negative electrode material for nonaqueous electrolyte secondary battery as described in any one of 1 to 8 above, wherein the average degree of circularity of the spheroidized graphitic particle used for the carbon material B as determined by a flow-type particle analyzer is 0.88 or more.

10. The negative electrode material for nonaqueous electrolyte secondary battery as described in any one of 1 to 9 above, wherein the pore volumes in the range of 10 to 100,000 nm of the carbon material A and the carbon material B as measured by the mercury intrusion method, are 0.4 ml/g or more.

11. The negative electrode material for nonaqueous electrolyte secondary battery as described in any one of 1 to 10 above, wherein the average particle diameter of the carbon material A is from 2 to 30 μm.

12. A negative electrode for nonaqueous electrolyte secondary battery, comprising: a negative electrode layer containing the negative electrode material for nonaqueous electrolyte secondary battery described in any one of 1 to 11 above and a binder resin; and a current collector.

13. A nonaqueous electrolyte secondary battery comprising the negative electrode described in 12 above, a positive electrode capable of storing/releasing lithium ion, and a nonaqueous electrolytic solution.

Advantage of the Invention

A nonaqueous electrolyte secondary battery using, as an electrode, the negative electrode material for nonaqueous electrolyte secondary battery of the present invention exhibits an excellent performance satisfying both rapid charge-discharge characteristics and high cycle characteristics.

MODE FOR CARRYING OUT THE INVENTION

The negative electrode material for nonaqueous electrolyte secondary battery of the present invention (hereinafter, sometimes referred to as the negative electrode material of the present invention) is a mixed carbon material containing the following carbon material A and carbon material B:
(Carbon Material A)
a multilayer-structure carbon material containing a graphitic particle and an amorphous carbon covering the surface thereof, which is a carbon material where the interplanar spacing (d002) of 002 planes by the wide-angle X-ray diffraction method is 3.37 Å or less, Lc is 900 Å or more, the tap density is 0.8 g/cm³ or more, and the Raman R value that is a ratio of the peak intensity near 1,360 cm⁻¹ to the peak intensity near 1,580 cm⁻¹ in the argon ion laser Raman spectrum is from 0.25 to 0.6, (Carbon Material B)

a carbon material where the interplanar spacing (d002) of 002 planes by the wide-angle X-ray diffraction method is 3.37 Å or less, Lc is 900 Å or more, the tap density is 0.8 g/cm³ or more, and the Raman R value that is a ratio of the peak intensity near 1,360 cm⁻¹ to the peak intensity near 1,580 cm⁻¹ in the argon ion laser Raman spectrum is from 0.11 to 0.2.

[Carbon Material A]

(a) Interplanar Spacing (d002) of 002 Planes by Wide-Angle X-Ray Diffraction Method In the carbon material A, the interplanar spacing (d002) of 002 planes by the wide-angle X-ray diffraction method is 3.37 Å or less, and Lc is 900 Å or more. The interplanar spacing (d002) of 002 planes by the wide-angle X-ray diffraction method is measured by the method described later in Examples.

When the interplanar spacing (d002) of 002 planes by the wide-angle X-ray diffraction method is 3.37 Å or less and Lc is 900 Å or more, this indicates that the carbon material has high crystallinity in most portions excluding the surface of a particle thereof and is a carbon material working out to a high-capacity negative electrode material free from capacity reduction due to such a large irreversible capacity as seen in an amorphous carbon material.

(b) Tap Density

The tap density of the carbon material A is 0.8 g/cm³ or more, preferably 0.85 g/cm³ or more. The tap density is measured by the method described later in Examples. The tap density being 0.8/cm³ or more indicates that the carbon material A provides a spherical appearance.

If the tap density is less than 0.8 g/cm³, this indicates that the spherical graphitic particle as a raw material of the carbon material A is not formed as an adequately spherical particle, and in this case, a continuous void is not sufficiently ensured in the electrode and the mobility of Li ion in the electrolytic solution held in the void is impaired, giving rise to reduction in the rapid charge-discharge characteristics.

(c) Raman R Value

In the carbon material A, the Raman R value that is a ratio of the peak intensity near 1,360 cm⁻¹ to the peak intensity near 1,580 cm⁻¹ in the argon ion laser Raman spectrum is from 0.25 to 0.6, preferably from 0.25 to 0.5, more preferably from 0.25 to 0.4.

When the Raman R value that is a ratio of the peak intensity near 1,360 cm⁻¹ to the peak intensity near 1,580 cm⁻¹ in the argon ion laser Raman spectrum is 0.25 or more, this indicates that the carbon material is a multilayer-structure carbon material in which the surface of a graphitic carbon particle is covered with an amorphous carbon, and at the same time, that the spherical graphitic carbon particle surface before covering has a fine crack, chipping, a structural defect or the like created due to damage by a mechanical energy treatment.

Studies of the present inventors have revealed that the targeted rapid charge-discharge characteristics are not achieved when using a carbon material in which the Raman R value of the multilayer-structure carbon material for electrode is 0.25 or less. The Raman R value of the multilayer-structure carbon material is governed by the Raman R value of the graphitic carbon before covering with the amorphous carbon and the Raman R value of the covering amorphous carbon. If the Raman R value of the multilayer-structure carbon material is low, this indicates that the Raman R value of the graphitic carbon before covering is low and the graphitic carbon particle is not a spheroidized particle having received on the particle surface thereof a sufficient damage by a mechanical energy treatment, and in this case, the amount of sites for receiving or releasing Li ion, such as fine crack, chipping and structural defect on the graphitic particle surface due to damage, is small, giving rise to bad rapid charging-discharging property for Li ion.

Also, if the Raman R value of the carbon material A exceeds 0.6, this indicates that the amount of the amorphous carbon covering the graphitic particle is large, and in this case, the effect on the magnitude of irreversible capacity by the amorphous carbon amount is increased and a small battery capacity results.

That is, the carbon material A is a material where a graphitic particle obtained by spheroidizing a flat graphite particle while involving folding, winding or chamfering, and at the same time, creating a fine crack, chipping, a structural defect or the like on the particle surface is covered with an amorphous carbon.

Also, the carbon material A is a spheroidized particle enjoying high Li ion acceptability of the amorphous carbon and thanks to a fine crack, chipping or a structural defect on the surface of the graphitic particle working as a core, allowing Li ion to easily enter or leave the interior crystal of graphite, and therefore, this is a carbon material capable of ensuring communicating voids in the electrode and by a synergistic effect with good mobility of Li ion, enhancing the rapid charging-discharging property.

At the same time, the carbon material A is a negative electrode carbon material having both high capacity by virtue of the particle body except for the particle surface being graphitic, and low irreversible capacity because the covering amorphous carbon produces an effect of suppressing an excessive reaction with an electrolytic solution.

(d) 3R/2H

The wide-angle X-ray diffraction method is used to determine a value indicative of crystallinity of the entire particle, and the argon ion laser Raman spectrum is utilized to determine a value indicative of the surface property of a particle. The wide-angle X-ray diffraction method performs the measurement by the method described later in Examples. In the carbon material A, the ratio 3R/2H between the intensity 3R (hereinafter, sometimes referred to as rhombohedral 3R) (101) of 101 plane based on orientation of a rhombohedral graphite layer and the intensity 2H (hereinafter, sometimes referred to as hexagonal 2H) (101) of 101 plane based on orientation of a hexagonal graphite layer, as determined by the wide-angle X-ray diffraction method, is preferably 0.1 or more, more preferably 0.2 or more.

The rhombohedral crystal structure is a crystal morphology where a stack of graphite network plane structures is repeated for every three layers. Also, the hexagonal crystal structure is a crystal morphology where a stack of graphite network plane structures is repeated for every two layers. In the case of a graphitic particle showing a crystal morphology where the ratio of the rhombohedral crystal structure 3R is large, Li ion acceptability is high compared with a graphite particle where the ratio of the rhombohedral crystal structure 3R is small.

(e) Specific Surface Area by BET Method

The specific surface area of the carbon material A by the BET method is preferably from 0.5 to 8 m²/g, more preferably from 1 to 6 m²/g, still more preferably from 2 to 5 m²/g. The specific surface area by the BET method is measured by the method described later in Examples.

By setting the specific surface area of the carbon material A to 0.5 m$^2$/g or more, the Li ion acceptability is enhanced, and by setting it to 8 m$^2$/g or less, the battery capacity can be prevented from reduction due to increase in the irreversible capacity.

(f) Pore Volume

The pore volume of the carbon material A by the mercury intrusion method in the range of 10 to 100,000 nm is preferably 0.4 ml/g or more, more preferably 0.5 ml/g or more. The pore volume is measured by the method described later in Examples. By setting the pore volume to 0.4 ml/g or more, the area for entering/leaving of Li ion is increased.

(g) Average Particle Diameter

The average particle diameter of the carbon material A is preferably from 2 to 30 μm, more preferably from 4 to 20 μm, still more preferably from 6 to 15 μm. The average particle diameter is measured by the method described later in Examples.

By setting the average particle diameter to 2 μm more, the irreversible capacity can be prevented from increasing due to a large specific surface area, and by setting it to 30 μm or less, the rapid charging-discharging property can be prevented from deterioration due to decrease in the contact area of the electrolytic solution with the carbon material A particle.

(h) Interplanar Spacing (d002) of 002 Planes of Graphitic Particle

In the graphitic particle before covering with an amorphous carbon, used in the carbon material A, the interplanar spacing (d002) of 002 planes by the X-ray diffraction method is preferably 3.37 Å or less, and Lc is preferably 900 Å or more. When the interplanar spacing (d002) of 002 planes of the graphitic particle before covering with an amorphous carbon is 3.37 Å or less and Lc is 900 Å or more, a high-capacity electrode insusceptible to capacity reduction due to increase in the irreversible capacity is obtained.

(i) Tap Density of Graphitic Particle

The tap density of the graphitic particle before covering with an amorphous carbon, used in the carbon material A, is preferably 0.8 g/cm$^3$ or more. When the tap density of the graphitic particle before covering with an amorphous carbon is 0.8 g/cm$^3$ or more, a carbon material satisfying both high capacity and rapid discharge characteristics can be obtained.

(j) Raman R Value of Graphitic Particle

In the graphitic particle before covering with an amorphous carbon, used in the carbon material A, the Raman R value that is a ratio of the peak intensity near 1,360 cm$^{-1}$ to the peak intensity near 1,580 cm$^{-1}$ in the argon ion laser Raman spectrum is preferably from 0.2 to 0.5, more preferably from 0.2 to 0.4.

When the Raman R value is 0.2 or more, this indicates that a fine crack, chipping, a structural defect or the like is created in the graphitic particle surface due to a damage given by applying a mechanical energy treatment in the process of spheroidizing the graphitic particle. Also, when the Raman R value is 0.5 or less, this indicates that the mechanical energy treatment is not so excessive as destroying the crystal structure itself of the graphitic particle and the battery capacity is kept from reduction due to increase in the irreversible capacity, which is caused resulting from destruction of the crystal structure of the graphitic particle.

(k) Average Degree of Circularity of Graphitic Particle

As to the average degree of circularity, in a flow-type particle analyzer capable of individually photographing thousands of particles dispersed in a liquid by using a CCD camera and calculating the average profile parameter, the measurement is performed for particles in the range from 10 to 40 μm by the method described later in Examples.

The average degree of circularity is a ratio using the circumferential length of a particle area-equivalent circle as the numerator and using the circumferential length of a particle projected image photographed as the denominator. As the particle image is closer to a true circle, the value approximates 1, and when the particle image is long/thin or irregular, the value becomes small.

The average degree of circularity of the graphitic particle before covering with an amorphous carbon, used in the carbon material A, is preferably 0.88 or more. By setting the average degree of circularity to the range above, a carbon material satisfying both high capacity and rapid discharge characteristics can be obtained. Also, the graphitic particle before covering with an amorphous carbon, used in the carbon material A, is preferably a spheroidized graphitic particle.

(l) Interplanar Spacing (d002) of 002 Planes of Amorphous Carbon

In the amorphous carbon covering the surface of the graphitic particle, used in the carbon material A, the interplanar spacing (d002) of 002 planes by the wide-angle X-ray diffraction method is preferably 3.40 Å or less, and Lc is preferably 500 Å or more. When the interplanar spacing (d002) of 002 planes is 3.40 Å or less and Lc is 500 Å or more, the Li ion acceptability can be enhanced.

(m) Production Method of Carbon Material A

The carbon material A may be produced without problem by any production method as long as it has the above-described properties, but, for example, a multilayer-structure carbon material for electrode described in Japanese Patent No. 3,534,391 may be used. Specifically, for example, a mechanical energy treatment is applied to a naturally-produced flake-like, scale-like, plate-like or lump-like graphite or an artificial graphite produced by heating petroleum coke, coal pitch coke, coal needle coke, mesophase pitch or the like at 2,500° C. or more, whereby the graphitic particle before covering can be produced.

In the mechanical energy treatment, for example, an apparatus with a rotor having a large number of blades provided inside a casing is used, and the rotor is rotated at a high speed to repeatedly apply a mechanical action such as impact compression, friction and shear force to the natural graphite or artificial graphite introduced into the inside of the rotor, whereby the carbon material can be produced.

The carbon material A can be obtained by mixing the above-described graphitic particle with a petroleum-based or coal-based tar or pitch and a resin such as polyvinyl alcohol, polyacryl nitrile, phenolic resin and cellulose, by using, if desired, a solvent or the like, and firing the mixture in a non-oxidizing atmosphere at 500 to 2,500° C., preferably from 700 to 2,000° C., more preferably from 800 to 1,500° C. If desired, pulverization and classification are sometimes performed after the firing.

The coverage that is the amount of the amorphous carbon covering the graphite particle is preferably from 0.1 to 20%, more preferably from 0.2 to 15%, still more preferably from 0.4 to 10%. The coverage can be determined by the method described later in Examples.

By setting the coverage to 0.1% or more, high Li ion acceptability of the amorphous carbon can be fully utilized and good rapid charging property is obtained. Also, by setting the coverage to 20% or less, the capacity reduction due to increase in the effect of the amorphous carbon amount on the magnitude of irreversible capacity can be prevented.

[Carbon Material B]

(a) Interplanar Spacing (d002) of 002 Planes

In the carbon material B, the interplanar spacing (d002) of 002 planes by the wide-angle X-ray diffraction method is 3.37 Å or less, and Lc is 900 Å or more. When the interplanar spacing (d002) of 002 planes by the wide-angle X-ray diffraction method is 3.37 Å or less and Lc is 900 Å or more, this indicates that the carbon material B has high crystallinity in most portions excluding the surface of a particle thereof and is a carbon material working out to a high-capacity electrode free from capacity reduction due to such a large irreversible capacity as seen in an amorphous carbon material.

(b) Tap Density

The tap density of the carbon material B is 0.8 g/cm$^3$ or more, preferably 0.85 g/cm$^3$ or more. The tap density is measured by the method described later in Examples.

When the tap density of the carbon material B is 0.8 g/cm$^3$ or more, the carbon material B provides a spherical appearance. If the tap density is less than 0.8 g/cm$^3$, this indicates that the spherical graphitic particle as a raw material of the carbon material B is not formed as an adequately spherical particle. If the tap density is less than 0.8 g/cm$^3$, a continuous void is not sufficiently ensured in the electrode and the mobility of Li ion in the electrolytic solution held in the void is impaired, giving rise to reduction in the rapid charge-discharge characteristics.

(c) Raman R Value

In the carbon material B, the Raman R value that is a ratio of the peak intensity near 1,360 cm$^{-1}$ to the peak intensity near 1,580 cm$^{-1}$ in the argon ion laser Raman spectrum is from 0.11 to 0.2.

When the Raman R value is from 0.11 to 0.2, this indicates that the carbon material B is preferably a multilayer-structure carbon material containing a spheroidized graphitic particle and a graphitic carbon covering the surface thereof and the carbon formed by covering the surface of the spheroidized graphitic carbon particle is not an amorphous carbon as in the carbon material A but is a graphitized graphitic carbon.

Also, a fine crack, chipping, a structural defect or the like is created on the surface of the spheroidized graphitic carbon particle before covering due to damage by a mechanical energy treatment and therefore, the Raman R value is not 0.11 or less that is a value shown by a general material after graphitization.

That is, the carbon material B is preferably a material containing a spheroidized graphitic particle obtained by spheroidizing a flat graphite particle while involving folding, winding or chamfering and at the same time, forming a fine crack, chipping, a structural defect or the like on the particle surface thereof, and a graphitic carbon covering the surface of the spheroidized graphitic particle.

The carbon material B that is a multilayer-structure carbon material containing a spheroidized graphitic particle and a graphitic carbon covering the surface thereof is a high-capacity carbon material excellent in electron conductivity and rapid discharge characteristics, which enjoys high electron conductivity of both the spheroidized graphitic particle and the graphitic carbon covering the surface thereof, allows Li ion to easily enter or leave the graphite bulk crystal thanks to a fine crack, chipping or a structural defect on the surface of the graphitic particle working as a core, and at the same time, satisfies good Li ion mobility by ensuring a continuous void in the electrode because of a spheroidized particle.

(d) Specific Surface Area by BET Method

The specific surface area of the carbon material B by the BET method is preferably from 8 m$^2$/g or less, more preferably 6 m$^2$/g or less, and is preferably 0.5 m$^2$/g or more, more preferably 1 m$^2$/g or more.

By setting the specific surface area to 8 m$^2$/g or less, the capacity can be prevented from reduction due to increase in the irreversible capacity. Also, by setting the specific surface area to 0.5 m$^2$/g or more, the area for receiving or releasing lithium is increased and an electrode excellent in rapid charging or rapid discharging property can be obtained.

(e) Pore Volume

The pore volume of the carbon material B by the mercury intrusion method in the range of 10 to 100,000 nm is preferably 0.4 ml/g or more. By setting the pore volume to 0.4 ml/g or more, the area for entering/leaving of Li ion is increased.

(f) Average Particle Diameter

The average particle diameter of the carbon material B is preferably from 2 to 30 μm, more preferably from 4 to 20 μm, still more preferably from 6 to 15 μm. By setting the average particle diameter to 2 μm more, the irreversible capacity can be prevented from increasing due to a large specific surface area, and by setting the average particle diameter to 30 μm or less, the rapid charging-discharging property can be prevented from reduction due to decrease in the contact area of the electrolytic solution with the carbon material B particle.

(g) Interplanar Spacing (d002) of 002 Planes of Spheroidized Graphitic Particle

In the spheroidized graphitic particle before covering with a graphitic carbon, used in the carbon material B, the interplanar spacing (d002) of 002 planes by the wide-angle X-ray diffraction method is preferably 3.37 Å or less, and Lc is preferably 900 Å or more. When the interplanar spacing (d002) of 002 planes of the spheroidized graphitic particle before covering with a graphitic carbon is 3.37 Å or less and Lc is 900 Å or more, a high-capacity electrode insusceptible to capacity reduction due to increase in the irreversible capacity is obtained.

(h) Tap Density of Spheroidized Graphitic Particle

The tap density of the spheroidized graphitic particle before covering with a graphitic carbon, used in the carbon material B, is preferably 0.8 g/cm$^3$ or more.

When the tap density of the spheroidized graphitic particle before covering with a graphitic carbon is 0.8 g/cm$^3$ or more, a carbon material satisfying both high capacity and rapid discharge characteristics can be obtained.

(i) Raman R Value of Spheroidized Graphitic Particle

In the spheroidized graphitic particle before covering with a graphitic carbon, used in the carbon material B, the Raman R value that is a ratio of the peak intensity near 1,360 cm$^{-1}$ to the peak intensity near 1,580 cm$^{-1}$ in the argon ion laser Raman spectrum is preferably from 0.2 to 0.5, more preferably from 0.2 to 0.4.

When the Raman R value of the spheroidized graphitic particle before covering with a graphitic carbon is from 0.2 to 0.5, this indicates that a flat graphite particle is spheroidized while involving folding, winding or chamfering and at the same time, a fine crack, chipping, a structural defect or the like is created on the particle surface.

That is, it is indicated that the spheroidized graphite particle is a graphitic particle where a fine crack, chipping, a structural defect of the like is created on the particle surface simultaneously with spheroidization.

Also, it is indicated that the spheroidized graphite particle is a carbon material enhanced in the rapid charging-discharging property by a synergistic effect between easy entering of Li ion into the graphite bulk crystal thanks to a fine crack, chipping or a structural defect on the surface and good Li ion mobility by ensuring voids in the electrode because of a spheroidized graphite particle.

(j) Average Degree of Circularity of Spheroidized Graphitic Particle

The average degree of circularity measured as above of the spheroidized graphitic particle before covering with a graphitic carbon, used in the carbon material B, is preferably 0.88 or more. By setting the average degree of circularity of the spheroidized graphitic particle before covering with a graphitic carbon to 0.88 or more, a carbon material satisfying both high capacity and rapid discharge characteristics can be obtained.

(k) Interplanar Spacing (d002) of 002 Planes of Graphitic Carbon

In the graphitic carbon covering the surface of the graphitic particle, used in the carbon material B, the interplanar spacing (d002) of 002 planes by the wide-angle X-ray diffraction method is preferably 3.40 Å or less, and Lc is preferably 500 Å or more. When the interplanar spacing (d002) of 002 planes is 3.40 Å or less and Lc is 500 Å or more, the electron conductivity of the carbon material B can be enhanced, and the irreversible capacity can be reduced.

(l) Production Method of Carbon Material B

The carbon material B may be produced without problem by any production method as long as it has the above-described properties, but the carbon material may be obtained, for example, from a multilayer-structure carbon material for electrode described in Japanese Patent No. 3,534,391 directly or through firing at 1,500° C. or more.

Specifically, for example, the above-described mechanical energy treatment is applied to a naturally-produced flake-like, scale-like, plate-like or lump-like graphite or an artificial graphite produced by heating petroleum coke, coal pitch coke, coal needle coke, mesophase pitch or the like at 2,500° C. or more, whereby the spheroidized graphitic particle before covering can be produced.

In the case of a multilayer-structure carbon material containing a spheroidized graphitic particle and a graphitic carbon covering the surface thereof, the carbon material B can be obtained by mixing the above-described spheroidized graphitic particle with a petroleum-based or coal-based tar or pitch and a resin such as polyvinyl alcohol, polyacryl nitrile, phenolic resin and cellulose, by using, if desired, a solvent or the like, and firing the mixture in a non-oxidizing atmosphere preferably at 1,500° C. or more, more preferably 1,800° C. or more, still more preferably 2,000° C. or more to form an amorphous covering on the spheroidized carbon particle. Then further firing to form a graphitized covering on the spheroidized carbon particle, preferably at a temperature of up to 3,000° C. If desired, pulverization and classification are sometimes performed after the firing.

The coverage that is the amount of the graphitic carbon covering the spheroidized graphite particle is preferably from 0.1 to 50%, more preferably from 0.5 to 30%, still more preferably from 1 to 20%.

By setting the coverage to 0.1% or more, the irreversible capacity reducing effect obtained by covering with a graphitic carbon, that is, the irreversible capacity reducing effect produced by putting a covering of graphitic carbon on the spheroidized graphitic particle serving as a core having an irreversible capacity, can be fully brought out. Also, when the coverage is 50% or less, in the grinding performed to recover particles after firing because a strong binding force of particles to each other is developed after firing due to the covering graphite carbon, it can be avoided to require an operation of, for example, increasing the grinding or rotation speed or performing multi-stage grinding. Furthermore, by setting the coverage to 50% or less, the BET specific surface area of the graphitic carbon-coated graphite particle can be prevented from increasing to produce a large irreversible capacity as the binding force of particles to each other becomes strong due to the covering graphitic carbon.

As described above, the carbon material A is a multilayer-structure carbon material containing a graphite particle and an amorphous carbon covering the surface thereof. Also, the carbon material B is preferably a multilayer-structure carbon material containing a spheroidized graphite particle and a graphitic carbon covering the surface thereof.

[Negative Electrode Material for Nonaqueous Electrolyte Secondary Battery]

(a) Mixing Ratio of Carbon Material A and Carbon Material B

The negative electrode material of the present invention a mixed material containing the above-described carbon material A and carbon material. In the negative electrode material of the present invention, the ratio of the carbon material B is preferably from 10 to 90 wt %, more preferably from 20 to 80 wt %, still more preferably from 30 to 70 wt %, based on the total amount of the carbon material A and the carbon material B.

By setting the ratio of the carbon material B to 90 wt % or less based on the total amount of the carbon material A and the carbon material B, rapid charging property attributable to the covering amorphous carbon, which is a particularly excellent property of the carbon material A, can be prevented from being impaired and good rapid charging characteristics can be obtained. Also, by setting the ratio of the carbon material B to 10 wt % or more, an electrode fully utilizing the electron conductivity that is a particularly excellent property of the carbon material B can be fabricated and sufficient cycle characteristics are obtained.

(b) Ratio in Average Particle Diameter Between Carbon Material A and Carbon Material B The ratio in the average particle diameter between the carbon materials A and B mixed (average particle diameter of carbon material A/average particle diameter of carbon material B) is preferably from 0.7 to 1.3, more preferably from 0.8 to 1.2.

If the difference in the average particle diameter between the carbon material A and the carbon material B is large, the particle size distribution of the mixed carbon material becomes wide and when an electrode is formed using the mixed carbon material, the space between particles is filled with particles having a small particle diameter, and the amount of the electrolytic solution held is decreased, making it difficult for Li ion to move.

On the other hand, when the difference in the average particle diameter between carbon materials mixed is small, that is, when the ratio in the average particle diameter between the carbon material A and the carbon material B is from 0.7 to 1.3, the particle size distribution of the mixed carbon material becomes sharp and the amount of particles as small as filling the space between particles is reduced, so that when an electrode is formed using the carbon material, an adequate interparticle spacing for holding an electrolytic solution can be ensured.

[Negative Electrode]

In producing a negative electrode by using the negative electrode material of the present invention, the negative electrode material blended with a binder resin may be made into a slurry with an aqueous or organic medium and after adding a thickening agent, if desired, the slurry may be coated on a current collector and dried.

As the binder resin, a resin that is stable to a nonaqueous electrolytic solution and water-insoluble is preferably used. Examples of the resin which can be used include a rubbery polymer such as styrene, butadiene rubber, isoprene rubber, and ethylene-propylene rubber; a synthetic resin such as polyethylene, polypropylene, polyethylene terephthalate, and aromatic polyamide; a thermoplastic elastomer such as styrene-butadiene-styrene block copolymer or hydrogenated product thereof, styrene-ethylene-butadiene, styrene copolymer, and styrene-isoprene-styrene block copolymer or hydrogenated product thereof; a soft resinous polymer such as syndiotactic-1,2-polybutadiene, ethylene-vinyl acetate copolymer, and copolymer of ethylene and α-olefin having a carbon number of 3 to 12; and a fluorinated polymer such as polytetratluoroethylene-ethylene copolymer, polyvinylidene fluoride, polypentafluoropropylene, and polyhexafluoropropylene. Examples of the organic medium include N-methylpyrrolidone and dimethylformamide.

The binder resin is preferably used in an amount of usually 0.1 parts by weight or more, preferably 0.2 parts by weight, per 100 parts by weight of the negative electrode material. When the ratio of the binder resin is 0.1 parts by weight or more per 100 parts by weight of the negative electrode material, the binding force between negative electrode materials or between the negative electrode material and the current collector becomes sufficiently high, and decrease in the battery capacity and deterioration of the cycle characteristics can be prevented from occurring due to separation of the negative electrode material from the negative electrode.

Also, the binder resin is preferably used in an amount of usually 10 parts by weight or less, preferably 7 parts by weight or less, per 100 parts by weight of the negative electrode material. When the ratio of the binder resin is 10 parts by weight or less per 100 parts by weight of the negative electrode material, decrease in the capacity of the negative electrode can be prevented and a problem that lithium ion is blocked from entering/leaving the negative electrode material can be avoided.

As the thickening agent added to the slurry, for example, water-soluble celluloses such as carboxymethyl cellulose, methyl cellulose, hydroxyethyl cellulose and hydroxypropyl cellulose, polyvinyl alcohol and polyethylene glycol may be used. Among these, carboxymethyl cellulose is preferred. The thickening agent is preferably used in an amount of usually from 0.1 to 10 parts by weight, preferably from 0.2 to 7 parts by weight, per 100 parts by weight of the negative electrode material.

As the negative electrode current collector, for example, copper, copper alloy, stainless steel, nickel, titanium and carbon, whose use for this application have been conventionally known, may be used. The shape of the current collector is usually a sheet shape, and it is also preferred to use a sheet with the surface being made uneven, a net, a punched metal or the like.

After the slurry containing the negative electrode material and a binder resin is coated and dried on a current collector, a pressure is preferably applied to increase the density of the electrode formed on a current collector and make large the battery capacity per unit volume of the negative electrode layer. The density of the electrode is preferably from 1.2 to 1.8 g/cm$^3$, more preferably from 1.3 to 1.6 g/cm$^3$.

By setting the electrode density to 1.2 g/cm$^3$ or more, the capacity of the battery can be prevented from decreasing due to increase in the thickness of the electrode. Also, by setting the electrode density to 1.8 g/cm$^3$ or less, the amount of an electrolytic solution held in a space can be prevented from decreasing due to reduction in the interparticle spacing inside the electrode to impair the mobility of Li ion and the rapid charging-discharging property.

[Nonaqueous Electrolyte Secondary Battery]

The nonaqueous electrolyte secondary battery of the present invention can be fabricated according to a conventional method except for using the above-described negative electrode. Examples of the positive electrode material which may be used include a transition metal oxide material such as lithium transition metal composite oxide (for example, a lithium cobalt composite oxide having a basic composition represented by $LiCoO_2$, a lithium nickel composite oxide represented by $LiNiO_2$, and a lithium manganese composite oxide represented by $LiMnO_2$ and $LiMn_2O_4$) and manganese dioxide, and a composite oxide mixture thereof. Furthermore, $TiS_2$, $FeS_2$, $Nb_3S_4$, $Mo_3S_4$, $CoS_2$, $V_2O_5$, $CrO_3$, $V_3O_3$, $FeO_2$, $GeO_2$, $LiNi_{0.33}Mn_{0.33}Co_{0.33}O_2$, and the like may be used.

The positive electrode material blended with a binder resin is made into a slurry with an appropriate solvent, and the slurry may be coated and dried on a current collector, whereby the positive electrode can be produced. Incidentally, an electrically conductive material such as acetylene black and Ketjen black is preferably incorporated into the slurry. If desired, a thickening agent may be also incorporated. As the thickening agent and the binder resin, those whose use for this application is well known, for example, those described as examples used for the production of the negative electrode, may be used.

The blending ratio per 100 parts by weight of the negative electrode material is preferably from 0.5 to 20 parts by weight, more preferably from 1 to 15 parts by weight, for the electrically conductive, and preferably from 0.2 to 10 parts by weight, more preferably from 0.5 to 7 parts by weight, for the thickening agent.

In the case of making a slurry with water, the blending ratio of the binder resin is preferably from 0.2 to 10 parts by weight, more preferably from 0.5 to 7 parts by weight, and in the case of making a slurry with an organic solvent capable of dissolving the binder resin, such as N-methylpyrrolidone, the blending ratio is preferably from 0.5 to 20 parts by weight, more preferably from 1 to 15 parts by weight.

Examples of the positive electrode current collector include aluminum, titanium zirconium hafnium, niobium, tantalum, and an alloy thereof. Among these, aluminum, titanium, tantalum, and an alloy thereof are preferred, aluminum, and an alloy thereof are most preferred.

As the electrolytic solution, a conventionally known electrolytic solution obtained by dissolving various lithium salts in a nonaqueous solvent may be used. Examples of the nonaqueous solvent which may be used include a cyclic carbonate such as ethylene carbonate, propylene carbonate, butylene carbonate and vinylene carbonate, a chain carbonate such as dimethyl carbonate and ethyl methyl carbonate, a cyclic ester such as γ-butyrolactone, a cyclic ether such as crown ether, 2-methyltetrahydrofuran, tetrahydrofuran, 1,2-dimethyltetrahydrofuran and 1,3-dioxolane, and a chain carbonate such as 1,2-dimethoxyethane. Usually, some of these are used in combination. Above all, a cyclic carbonate and a chain carbonate, or these solvents and further another solvent, are preferably used in combination.

Also, a compound such as vinylene carbonate, vinylethylene carbonate, succinic anhydride, maleic anhydride, propanesultone and diethylsulfone, and a difluorophosphate such as lithium difluorophosphate, may be added. Furthermore, an overcharge inhibitor such as diphenylether and cyclohexylbenzene may be also added.

As the electrolyte that is dissolved in the nonaqueous solvent, for example, $LiClO_4$, $LiPF_6$, $LiBF_4$, $LiCF_3SO_3$, LiN (CF$_3$SO$_2$)$_2$, LiN(CF$_3$CF$_2$SO$_2$)$_2$, LiN(CF$_3$SO$_2$)(C$_4$F$_9$SO$_2$) and LiC(CF$_3$SO$_2$)$_3$ may be used. The electrolyte in the electrolytic solution is preferably used at a concentration of usually from 0.5 to 2 mol/liter, preferably from 0.6 to 1.5 mol/liter.

As the separator provided to intervene between the positive electrode and the negative electrode, a porous sheet or nonwoven fabric made of polyolefin such as polyethylene and polypropylene is preferably used.

In the nonaqueous electrolyte secondary battery of the present invention, the volume ratio negative electrode/positive electrode is preferably set to be from 1.01 to 1.5, more preferably from 1.2 to 1.4.

EXAMPLES

The present invention is described in greater detail below by referring to Examples, but the present invention is not limited to these Examples.

Incidentally, the particle diameter, tap density, specific surface area by BET method, true density, X-ray diffraction, coverage of multilayer-structure carbon powder material, Raman R and the like as referred to in the description of the present invention were measured as follows.

Particle Diameter:

About 20 mg of carbon powder was added to about 1 ml of a 2 (volume) % aqueous solution of polyoxyethylene (20) sorbitan monolaurate, and the mixture was dispersed in about 200 ml of ion exchanged water. The resulting dispersion was measured for the volume-based particle size distribution by using a laser diffraction particle size distribution analyzer (LA-920, manufactured by Horiba Ltd.) to determine the average particle diameter(median diameter), the particle diameter d10 of 10% cumulative part, and the particle diameter d90 of 90% cumulative part. The measurement conditions were set to an ultrasonic dispersion for 1 minute, an ultrasonic intensity of 2, a circulation velocity of 2, and a relative refractive index of 1.50.

Tap Density:

The tap density was measured using Tap Denser KYT-3000 (manufactured by Seishin Enterprise Co., Ltd.). The carbon powder was caused to fall in a 20-cc tap cell through a sieve having a sieve opening of 300 μm to fill up the cell and thereafter, tapping with a stroke length of 10 mm was performed 1,000 times. The density here was taken as the tap density.

Average Degree of Circularity:

The measurement of the particle diameter distribution by the circle-equivalent diameter and the calculation of the degree of circularity were measured using a flow-type particle image analyzer (FPIA-2000, manufactured by Toa Medical Electronics Co. Ltd,). Ion exchanged water was used as the dispersion medium, and polyoxyethylene (20) monomethyl laurate was used as the surfactant. The equivalent-circle diameter is a diameter of a circle (equivalent circle) having the same projected area of a particle image photographed, and the degree of circularity is a ratio using the circumferential length of the equivalent circle as the numerator and using the circumferential length of a particle projected image photographed as the denominator. The degrees of circularity of particles in the measured range of 10 to 40 μm were averaged, and the obtained value was taken as the average degree of circularity.

Specific Surface Area by BET Method:

The measurement was performed using AMS-8000 manufactured by Ohkura Riken Co., Ltd.). The sample was pre- dried at 250° C. and after further flowing a nitrogen gas for 30 minutes, measured by the BET one-point method based on nitrogen gas adsorption.

Pore Volume (Pore Volume in the Range of 10 to 100,000 nm):

The measurement was performed by a mercury intrusion method using a mercury porosimeter (Autopore 9220, model name, manufactured by Micromeritics Corp. The sample was sealed in a 5-cc powder cell and pretreated (deaeration) by the mercury porosimeter in vacuum (50•Hg) at room temperature (24° C.) for 10 minutes. Subsequently, the mercury pressure was raised to 40,000 psia from 4.0 psia and then lowered to 15 psia (total number of measurement points: 120). At 120 measurement points, the amount of mercury intruded was measured after an equilibrium time of 5 seconds up to 30 psia and after an equilibrium time of 10 seconds at each subsequent pressure.

The pore distribution was calculated from the thus-obtained mercury intrusion curve by using the Washburn equation ($D=-(1/P)4\gamma \cos \psi$). Here, D represents the pore diameter, P represents the pressure applied, $\gamma$ represents the surface tension of mercury (485 dynes/cm was used), and $\psi$ represents the contact angle (140° was used).

True Density:

The true density was measured by using a pyconometer and using, as the medium, a 0.1 wt % aqueous solution of surfactant (polyoxyethylene (20) monolaurate).

X-Ray Diffraction:

A material prepared by adding and mixing X-ray standard high-purity silicon powder in a total amount of about 15 wt % with the carbon powder was measured for a wide-angle X-ray diffraction curve by a reflection diffractometer method using, as the radiation source, CuKα ray monochromatized with a graphite monochrometer. The interplanar spacing (d002) and the crystallite size (Lc) were determined using the Gakushin method, and 3R/2H was determined from the ratio between the intensity 3R(101) of 101 plane based on orientation of the rhombohedral graphite layer and the intensity 2H(101) of 101 plane based on the hexagonal graphite layer.

Coverage of Complex-Structure Carbon Material:

The coverage was determined according to the following formula.

$$\text{Coverage (wt \%)}=100-(K \times D)/((K+T) \times N) \times 100$$

wherein K represents the weight (Kg) of spherical graphitic carbon used for mixing with tar pitch, T represents the weight (kg) of tar pitch as a covering raw material used for mixing with spherical graphitic carbon, D represents the amount of a mixture actually used for firing out of the mixture of K and T, and N represents the weight of the coated spherical graphitic carbon material after firing.

Raman Measurement:

Using NR-1800 manufactured by JASCO Corp., the intensity IA of the peak PA near 1,580 cm$^{-1}$ and the intensity IB of the peak PB in the range of 1,360 cm$^{-1}$ were measured in a Raman spectrum analysis where argon ion laser light at a wavelength of 514.5 nm was used, and the intensity ratio R=IB/IA was determined. In preparing the sample, a material in a powder state was caused to freely fall in and fill the cell, and the measurement was performed by irradiating the sample surface in the cell with argon laser light while rotating the cell within a plane perpendicular to the laser light.

Press Load:

An electrode coated in a width of 5 cm was adjusted to the objective density by pressing with a load cell-attached roll of 250 m in diameter. The load required here was measured by the load cell, and the value obtained was taken as the press load.

Example 1

Production of Carbon Material A

A flake-like graphite particle which is naturally-produced graphite and in which the interplanar spacing (d002) of 002 planes by the wide-angle X-ray diffraction method is 3.36 Å, Lc is 1,000 Å or more, the tap density is 0.46 g/cm$^3$, the Raman R value that is a ratio of the peak intensity near 1,360 cm$^{-1}$ to the peak intensity near 1,580 cm$^{-1}$ in the argon ion laser Raman spectrum is 0.13, the average particle diameter is 28.7 μm, and the true density is 2.27 g/cm$^3$, was used as the raw material graphite.

The flake-like graphite particle was continuously treated using a hybridization system manufactured by Nara Machinery Co., Ltd. under the conditions of a rotor peripheral velocity of 60 m/sec, 10 minutes and a treatment rate of 20 kg/hour, whereby a spheroidization treatment was performed while giving a damage to the graphite particle surface. Thereafter, fine powder particles were removed by a classification treatment.

In this spheroidized graphitic carbon, the interplanar spacing (d002) of 002 planes by the wide-angle X-ray diffraction method was 3.36 Å, Lc was 1,000 Å or more, the tap density was 0.83 g/cm$^3$, the Raman R value that is a ratio of the peak intensity near 1,360 cm$^{-1}$ to the peak intensity near 1,580 cm$^{-1}$ in the argon ion laser Raman spectrum was 0.24, the average particle diameter was 11.6 μm, the specific surface ratio by BET method was 7.7 m$^2$/g, the true density was 2.27 g/cm$^3$, and the average degree of circularity was 0.909.

Subsequently, 100 parts by weight of the spheroidized graphitic carbon obtained above and 9.4 parts by weight of coal tar pitch were mixed under heating at 160° C. in a mixing machine, and the mixture was fired up to 1,000° C. over 2 weeks in a non-oxidizing atmosphere, then cooled to room temperature, and subjected to pulverization and classification, whereby a multilayer-structure spheroidized carbon material was obtained.

In this multilayer-structure spheroidized carbon material, the interplanar spacing (d002) of 002 planes by the wide-angle X-ray diffraction method was 3.36 Å, Lc was 1,000 Å or more, the tap density was 0.98 g/cm$^3$, the Raman R value that is a ratio of the peak intensity near 1,360 cm$^{-1}$ to the peak intensity near 1,580 cm$^{-1}$ in the argon ion laser Raman spectrum was 0.31, the average particle diameter was 11.6 μm, the particle diameter d10 was 7.6 μm, the particle diameter d90 was 17.5 μm, the specific surface ratio by BET method was 3.5 m$^2$/g, the coverage was 5.0%, the ratio 3R/2H between the rhombohedral 3R and the hexagonal 2H by the wide-angle X-ray diffraction method was 0.26, and the pore volume in the range of 10 to 100,000 nm was 0.74 ml/g. Separately, only the coal tar pitch was fired up to 1,000° C. in a non-oxidizing atmosphere, then cooled to room temperature, and subjected to pulverization and classification, and in the obtained amorphous carbon alone, the interplanar spacing (d002) of 002 planes by the wide-angle X-ray diffraction method was 3.45 Å, and Lc was 24 Å.

Production of Carbon Material B

A flake-like graphite particle which is naturally-produced graphite and in which the interplanar spacing (d002) of 002 planes by the wide-angle X-ray diffraction method is 3.36 Å, Lc is 1,000 Å or more, the tap density is 0.75 g/cm$^3$, the Raman R value that is a ratio of the peak intensity near 1,360 cm$^{-1}$ to the peak intensity near 1,580 cm$^{-1}$ in the argon ion laser Raman spectrum is 0.15, the average particle diameter is 61.1 μm, and the true density is 2.27 g/cm$^3$, was used as the raw material graphite.

The flake-like graphite particle was continuously treated using a hybridization system manufactured by Nara Machinery Co., Ltd. under the conditions of a rotor peripheral velocity of 60 m/sec, 10 minutes and a treatment rate of 20 kg/hour, whereby a spheroidization treatment was performed while giving a damage to the graphite particle surface. Thereafter, fine powder particles were removed by a classification treatment.

In this spheroidized graphitic carbon, the interplanar spacing (d002) of 002 planes by the wide-angle X-ray diffraction method was 3.36 Å, Lc was 1,000 Å or more, the tap density was 0.96 g/cm$^3$, the Raman R value that is a ratio of the peak intensity near 1,360 cm$^{-1}$ to the peak intensity near 1,580 cm$^{-1}$ in the argon ion laser Raman spectrum was 0.23, the average particle diameter was 13.1 μm, the specific surface ratio by BET method was 8.2 m$^2$/g, the true density was 2.26 g/cm$^3$, and the average degree of circularity was 0.919.

Subsequently, 100 parts by weight of the spheroidized graphitic carbon obtained above and 30 parts by weight of coal-derived pitch were mixed under heating at 160° C., and the mixture was fired up to 1,000° C. over 2 weeks in a non-oxidizing atmosphere, further fired up to 3,000° C. over 1 week, then cooled to room temperature, and subjected to pulverization and classification, whereby a multilayer-structure spheroidized carbon material was obtained.

In this multilayer-structure spheroidized carbon material, the interplanar spacing (d002) of 002 planes by the wide-angle X-ray diffraction method was 3.36 Å, Lc was 1,000 Å or more, the tap density was 1.19 g/cm$^3$, the Raman R value that is a ratio of the peak intensity near 1,360 cm$^{-1}$ to the peak intensity near 1,580 cm$^{-1}$ in the argon ion laser Raman spectrum was 0.13, the average particle diameter was 13.1 μm, the particle diameter d10 was 79.0 μm, the particle diameter d90 was 19.5 μm, the specific surface ratio by BET method was 4.4 m$^2$/g, the coverage was 16.8%, and the pore volume in the range of 10 to 100,000 nm was 0.46 ml/g.

(Production of Mixed Carbon Material)

The carbon material A and the carbon material B obtained above were mixed such that the ratio of the carbon material B became 30 wt % based on the total amount of the carbon material A and the carbon material B, whereby a mixed carbon material was obtained. The ratio of the average particle diameter of the carbon material A to the average particle diameter of the carbon material B was set to 11.6 μm/13.1 μm=0.89.

(Production of Battery for Performance Evaluation)

100 Parts by weight of the mixed carbon material above was added with 100 parts by weight of a 1 wt % aqueous solution of carboxymethyl cellulose and 2 parts by weight of a 50 wt % water dispersion of styrene butadiene rubber and kneaded to make a slurry. This slurry was coated at a basis weight of 4.4 mg/cm$^2$ on a copper foil by a doctor blade method and dried at 110° C., and the coated electrode with a width of 5 cm was consolidated by a roll press of 250 mm in diameter to give a density of 1.40 g/cm$^3$. The press load required for this consolidation was 240 kg. The resulting electrode was cut out to a 32 mm×42 mm rectangle and dried under reduced pressure at 190° C. to obtain a negative electrode.

85 Parts by weight of lithium-nickel-manganese-cobalt-based composite oxide powder was added with 10 parts by weight of carbon black, 41.7 parts by weight of a 12 wt % N-methylpyrrolidone solution of polyvinylidene fluoride, and an appropriate amount of N-methylpyrrolidone and kneaded to make a slurry, and this slurry was coated at a basis weight of 8.8 mg/cm$^2$ on an aluminum foil by a doctor blade method, dried at 110° C., consolidated by a roll press to give a positive electrode layer density of 2.45 g/cm$^3$, then cut out to a 30 mm×40 mm rectangle, and dried at 140° C. to obtain a positive electrode.

The negative electrode and positive electrode obtained above were superposed through a separator impregnated with an electrolytic solution to produce a battery for a charge/discharge test. As the electrolytic solution, a solution prepared by dissolving LiPF$_6$ in a mixed solution of ethylene carbonate:dimethyl carbonate:ethylmethyl carbonate=3:3:4 (by weight) to have a concentration of 1 mol/liter was used.

This battery was subjected to initial adjustment by repeating twice an operation of charging to 4.1 V at 0.2 C, further charging until 0.1 mA with 4.1 V, then discharging to 3.0 V at 0.2 C, subsequently charging to 4.2 V at 0.2 C, further charging until 0.1 mA with 4.2 V, and thereafter discharging to 3.0 V at 0.2 C.

(Evaluation of Rapid Discharging Property)

After charging to 4.2 V at 0.2 C (charging in 5 hours) and further charging for 2 hours with 4.2 V (0.2 C-CCCV), a discharge test to 3.0 V at 0.2 C (discharging in 5 hours), 1 C (discharging in 1 hour), 2 C (discharging in 0.5 hours), 5 C (discharging in 0.2 hours), 10 C (discharging in 0.1 hours) or 15 C (discharging in 0.07 hours) was performed, and the discharge capacity at each rate based on the discharge capacity at 0.2 C (discharging in 5 hours) was expressed in %. The results are shown in Table 1.

(Evaluation of Rapid Charging Property)

After charging to 4.2 V at 0.2 C (charging in 5 hours) and further charging for 2 hours with 4.2 V (0.2 C-CCCV), a charge test to 4.2 V at 0.2 C (charging in 5 hours), 1 C (charging in 1 hour), 2 C (charging in 0.5 hours), 5 C (charging in 0.2 hours), 8 C (charging in 0.13 hours) or 10 C (charging in 0.1 hours) was performed, and the charge capacity in each charge test based on the charge capacity after charging to 4.2 V at 0.2 C (charging in 5 hours) and further charging for 2 hours with 4.2 V (0.2 C-CCCV) was expressed in %. The results are shown in Table 1. Incidentally, discharging to 3.0 V at 0.2 C was performed after each charging.

(Evaluation of Cycle Characteristics)

Charging to 4.2 V at 2 C and discharging to 3.0 V at 3 C of the battery above were repeated, and the discharge capacities at 300th cycle and 500th cycle, based on the discharge capacity at 1st cycle, were expressed in % as a 300-cycles sustaining ratio and a 500-cycles sustaining ratio, respectively. The results are shown in Table 1.

Example 2

This was performed in the same manner as in Example 1 except for changing the ratio of the carbon material B to 50 wt % based on the total amount of the carbon material A and the carbon material B. The results are shown in Table 1.

Example 3

This Example was practiced in the same manner as in Example 1 except for changing the ratio of the carbon material B to 70 wt % based on the total amount of the carbon material A and the carbon material B. The results are shown in Table 1.

Example 4

Production of Carbon Material A

A flake-like graphite particle which is naturally-produced graphite and in which the interplanar spacing (d002) of 002 planes by the wide-angle X-ray diffraction method is 3.36 Å, Lc is 1,000 Å or more, the tap density is 0.46 g/cm$^3$, the Raman R value that is a ratio of the peak intensity near 1,360 cm$^{-1}$ to the peak intensity near 1,580 cm$^{-1}$ in the argon ion laser Raman spectrum is 0.13, the average particle diameter is 28.7 µm, and the true density is 2.27 g/cm$^3$, was used as the raw material graphite.

The flake-like graphite particle was continuously treated using a hybridization system manufactured by Nara Machinery Co., Ltd. under the conditions of a rotor peripheral velocity of 60 m/sec, 10 minutes and a treatment rate of 20 kg/hour, whereby a spheroidization treatment was performed while giving a damage to the graphite particle surface. Thereafter, fine powder particles were removed by a classification treatment.

In this spheroidized graphitic carbon, the interplanar spacing (d002) of 002 planes by the wide-angle X-ray diffraction method was 3.36 Å, Lc was 1,000 Å or more, the tap density was 0.83 g/cm$^3$, the Raman R value that is a ratio of the peak intensity near 1,360 cm$^{-1}$ to the peak intensity near 1,580 cm$^{-1}$ in the argon ion laser Raman spectrum was 0.24, the average particle diameter was 11.6 µm, the specific surface ratio by BET method was 7.7 m$^2$/g, the true density was 2.27 g/cm$^3$, and the average degree of circularity was 0.909.

Subsequently, 100 parts by weight of the spheroidized graphitic carbon obtained above and 7.8 parts by weight of coal-derived pitch were mixed under heating at 160° C. in a mixing machine, and the mixture was heated to 1,000° C. over 2 hours in a non-oxidizing atmosphere, held for 2 hours, then cooled to room temperature, and subjected to pulverization and classification, whereby a multilayer-structure spheroidized carbon material was obtained.

In this multilayer-structure spheroidized carbon material, the interplanar spacing (d002) of 002 planes by the wide-angle X-ray diffraction method was 3.36 Å, Lc was 1,000 Å or more, the tap density was 0.97 g/cm$^3$, the Raman R value that is a ratio of the peak intensity near 1,360 cm$^{-1}$ to the peak intensity near 1,580 cm$^{-1}$ in the argon ion laser Raman spectrum was 0.31, the average particle diameter was 11.1 µm, the particle diameter d10 was 7.2 µm, the particle diameter d90 was 17.1 µm, the specific surface ratio by BET method was 4.4 m$^2$/g, the coverage was 4.4%, the ratio 3R/2H between the rhombohedral 3R and the hexagonal 2H by the wide-angle X-ray diffraction method was 0.27, and the pore volume in the range of 10 to 100,000 nm was 0.75 ml/g.

Separately, only the coal-derived pitch was heated to 1,000° C. over 2 hours in a nitrogen atmosphere, held for 2 hours, then cooled to room temperature, and subjected to pulverization and classification, and in the obtained amorphous carbon alone, the interplanar spacing (d002) of 002 planes by the wide-angle X-ray diffraction method was 3.45 Å, and Lc was 24 Å.

Production of Carbon Material B

As the carbon material B, the same as that in Example I was used.

(Production of Mixed Carbon Material)

The carbon materials obtained above were mixed such that the ratio of the carbon material B became 50 wt % based on the total amount of the carbon material A and the carbon material B, whereby a mixed carbon material was obtained. The ratio of the average particle diameter of the carbon material A to the average particle diameter of the carbon material B was 11.1 μm/13.1 μm=0.85.

Others were performed in the same manner as in Example 1. The results are shown in Table 1.

Example 5

Production of Carbon Material A

A flake-like graphite particle which is naturally-produced graphite and in which the interplanar spacing (d002) of 002 planes by the wide-angle X-ray diffraction method is 3.36 Å, Lc is 1,000 Å or more, the tap density is 0.46 g/cm$^3$, the Raman R value that is a ratio of the peak intensity near 1,360 cm$^{-1}$ to the peak intensity near 1,580 cm$^{-1}$ in the argon ion laser Raman spectrum is 0.13, the average particle diameter is 28.7 μm, and the true density is 2.27 g/cm$^3$, was used as the raw material graphite.

The flake-like graphite particle was continuously treated using a hybridization system manufactured by Nara Machinery Co., Ltd. under the conditions of a rotor peripheral velocity of 60 m/sec, 10 minutes and a treatment rate of 20 kg/hour, whereby a spheroidization treatment of the flake-like graphite particle was performed while giving a damage to the graphite particle surface. Thereafter, fine powder particles were removed by a classification treatment.

In this spheroidized graphitic carbon, the interplanar spacing (d002) of 002 planes by the wide-angle X-ray diffraction method was 3.36 Å, Lc was 1,000 Å or more, the tap density was 0.83 g/cm$^3$, the Raman R value that is a ratio of the peak intensity near 1,360 cm$^{-1}$ to the peak intensity near 1,580 cm$^{-1}$ in the argon ion laser Raman spectrum was 0.24, the average particle diameter was 11.6 μm, the specific surface ratio by BET method was 7.7 m$^2$/g, the true density was 2.27 g/cm$^3$, and the average degree of circularity was 0.909.

Subsequently, 1,000 parts by weight of the spheroidized graphitic carbon obtained above and 4.5 parts by weight of coal-derived pitch were charged into Loedige mixer manufactured by MATSUBO Corporation, kneaded at 160° C., thereafter fired up to 1,000° C. over 2 weeks in a non-oxidizing atmosphere, then cooled to room temperature, and further subjected to pulverization and classification, whereby a multilayer-structure spheroidized carbon material was obtained.

In this multilayer-structure spheroidized carbon material, the interplanar spacing (d002) of 002 planes by the wide-angle X-ray diffraction method was 3.36 Å, Lc was 1,000 Å or more, the tap density was 0.99 g/cm$^3$, the Raman R value that is a ratio of the peak intensity near 1,360 cm$^{-1}$ to the peak intensity near 1,580 cm$^{-1}$ in the argon ion laser Raman spectrum was 0.35, the average particle diameter was 11.7 μm, the particle diameter d10 was 7.7 μm, the particle diameter d90 was 17.9 μm, the specific surface ratio by BET method was 4.0 m$^2$/g, the coverage was 2.9%, the ratio 3R/2H between the rhombohedral 3R and the hexagonal 2H by the wide-angle X-ray diffraction method was 0.26, and the pore volume in the range of 10 to 100,000 nm was 0.69 ml/g.

Separately, only the coal-derived pitch was fired up to 1,000° C., then cooled to room temperature, and subjected to pulverization and classification, and in the obtained amorphous carbon alone, the interplanar spacing (d002) of 002 planes by the wide-angle X-ray diffraction method was 3.45 Å, and Lc was 24 Å.

Production of Carbon Material B

As the carbon material B, the same as that in Example 1 was used.

(Production of Mixed Carbon Material)

The carbon materials obtained above were mixed such that the ratio of the carbon material B became 50 wt % based on the total amount of the carbon material A and the carbon material B, whereby a mixed carbon material was obtained. The ratio of the average particle diameter of the carbon material A to the average particle diameter of the carbon material B was 11.7 μm/13.1 μm=0.89.

Others were performed in the same manner as in Example 1. The results are shown in Table 1.

Comparative Example 1

This was performed in the same manner as in Example 1 except for not mixing the carbon material B with the carbon material A. The results are shown in Table 1.

Comparative Example 2

This was performed in the same manner as in Example 5 except for not mixing the carbon material B with the carbon material A. The results are shown in Table 1.

Comparative Example 3

A flake-like graphite particle which is naturally-produced graphite and in which the interplanar spacing (d002) of 002 planes by the wide-angle X-ray diffraction method is 3.36 Å, Lc is 1,000 Å or more, the tap density is 0.46 g/cm$^3$, the Raman R value that is a ratio of the peak intensity near 1,360 cm$^{-1}$ to the peak intensity near 1,580 cm$^{-1}$ in the argon ion laser Raman spectrum is 0.13, the average particle diameter is 28.7 μm, and the true density is 2.27 g/cm$^3$, was used as the raw material graphite.

The flake-like graphite particle was continuously treated using a hybridization system manufactured by Nara Machinery Co., Ltd. under the conditions of a rotor peripheral velocity of 60 m/sec, 10 minutes and a treatment rate of 20 kg/hour, whereby a spheroidization treatment was performed while giving a damage to the graphite particle surface. Thereafter, fine powder particles were removed by a classification treatment.

In this spheroidized graphitic carbon, the interplanar spacing (d002) of 002 planes by the wide-angle X-ray diffraction method was 3.36 Å, Lc was 1,000 Å or more, the tap density was 0.83 g/cm$^3$, the Raman R value that is a ratio of the peak intensity near 1,360 cm$^{-1}$ to the peak intensity near 1,580 cm$^{-1}$ in the argon ion laser Raman spectrum was 0.24, the average particle diameter was 11.6 μm, the specific surface ratio by BET method was 7.7 m$^2$/g, the true density was 2.27 g/cm$^3$, and the average degree of circularity was 0.909.

Subsequently, 100 parts by weight of the spheroidized graphitic carbon obtained above and 10 parts by weight of petroleum-derived pitch were charged into Loedige mixer manufactured by MATSUBO Corporation, kneaded at 90° C., thereafter fired up to 1,300° C. over 2 hours in a nitrogen atmosphere, held for 2 hours, then cooled to room temperature, and further subjected to pulverization and classification, whereby a multilayer-structure spheroidized carbon material was obtained.

In this multilayer-structure spheroidized carbon material, the interplanar spacing (d002) of 002 planes by the wide-angle X-ray diffraction method was 3.36 Å, Lc was 1,000 Å or more, the tap density was 0.99 g/cm$^3$, the Raman R value that is a ratio of the peak intensity near 1,360 cm$^{-1}$ to the peak intensity near 1,580 cm$^{-1}$ in the argon ion laser Raman spectrum was 0.22, the average particle diameter was 11.6 μm, the particle diameter d10 was 7.7 μm, the particle diameter d90 was 17.5 μm, the specific surface ratio by BET method was 3.8 m$^2$/g, the true density was 2.27 g/cm$^3$, the coverage was 3.0%, the ratio 3R/2H between the rhombohedral 3R and the hexagonal 2H by the wide-angle X-ray diffraction method was 0.24, and the pore volume in the range of 10 to 100,000 nm was 0.62 ml/g.

Separately, only the petroleum-derived pitch used above was fired up to 1,300° C. in a nitrogen atmosphere, held for 2 hours, then cooled to room temperature, and subjected to pulverization, and in the obtained amorphous carbon alone, the interplanar spacing (d002) of 002 planes by the wide-angle X-ray diffraction method was 3.45 Å, and Lc was 22 Å. Others were performed in the same manner as in Comparative Example 1. The results are shown in Table 1.

Comparative Example 4

Production of Carbon Material A

As the carbon material A, the same as that in Comparative Example 3 was used.

Production of Carbon Material B

A flake-like graphite particle which is naturally-produced graphite and in which the interplanar spacing (d002) of 002 planes by the wide-angle X-ray diffraction method is 3.36 Å, Lc is 1,000 Å or more, the tap density is 0.46 g/cm$^3$, the Raman R value that is a ratio of the peak intensity near 1,360 cm$^{-1}$ to the peak intensity near 1,580 cm$^{-1}$ in the argon ion laser Raman spectrum is 0.13, the average particle diameter is 28.7 μm, and the true density is 2.27 g/cm$^3$, was used as the raw material graphite.

The flake-like graphite particle was continuously treated using a hybridization system manufactured by Nara Machinery Co., Ltd. under the conditions of a rotor peripheral velocity of 60 m/sec, 10 minutes and a treatment rate of 15 kg/hour, whereby a spheroidization treatment was performed while giving a damage to the graphite particle surface. Thereafter, fine powder particles were removed by a classification treatment.

In this spheroidized graphitic carbon, the interplanar spacing (d002) of 002 planes by the wide-angle X-ray diffraction method was 3.36 Å, Lc was 1,000 Å or more, the tap density was 0.77 g/cm$^3$, the Raman R value that is a ratio of the peak intensity near 1,360 cm$^{-1}$ to the peak intensity near 1,580 cm$^{-1}$ in the argon ion laser Raman spectrum was 0.21, the average particle diameter was 10.6 μm, the specific surface ratio by BET method was 8.5 m$^2$/g, the true density was 2.26 g/cm$^3$, and the average degree of circularity was 0.909.

Subsequently, 100 parts by weight of the spheroidized graphitic carbon obtained above and 6 parts by weight of coal-derived tar were mixed under heating at 160° C., and the mixture was fired up to 1,000° C. over 2 weeks in a non-oxidizing atmosphere, further fired up to 2,000° C. over 1 week, then cooled to room temperature, and subjected to pulverization and classification, whereby a multilayer-structure spheroidized carbon material was obtained.

In this multilayer-structure spheroidized carbon material, the interplanar spacing (d002) of 002 planes by the wide-angle X-ray diffraction method was 3.36 Å, Lc was 1,000 Å or more, the tap density was 0.90 g/cm$^3$, the Raman R value that is a ratio of the peak intensity near 1,360 cm$^{-1}$ to the peak intensity near 1,580 cm$^{-1}$ in the argon ion laser Raman spectrum was 0.10, the average particle diameter was 10.6 μm, the particle diameter d10 was 7.0 μm, the particle diameter d90 was 16.2 μm, the specific surface ratio by BET method was 4.5 m$^2$/g, the coverage was 3.0%, and the pore volume in the range of 10 to 100,000 nm was 0.77 ml/g.

(Production of Mixed Carbon Material)

The carbon materials obtained above were mixed such that the ratio of the carbon material 13 became 50 wt % based on the total amount of the carbon material A and the carbon material B, whereby a mixed carbon material was obtained. The ratio of the average particle diameter of the carbon material A to the average particle diameter of the carbon material B was set to 11.6 μm/10.6 μm=1.09.

Others were performed in the same manner as in Example 1. The results are shown in Table 1.

TABLE 1

| Items | Unit | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
| Properties of Carbon Material A | | | | | | | | | | |
| d002 | Å | 3.36 | 3.36 | 3.36 | 3.36 | 3.36 | 3.36 | 3.36 | 3.36 | 3.36 |
| Lc | Å | >1000 | >1000 | >1000 | >1000 | >1000 | >1000 | >1000 | >1000 | >1000 |
| Raman R | | 0.31 | 0.31 | 0.31 | 0.31 | 0.35 | 0.31 | 0.35 | 0.22 | 0.22 |
| Tap density | g/cm$^3$ | 0.98 | 0.98 | 0.98 | 0.97 | 0.99 | 0.98 | 0.99 | 0.99 | 0.99 |
| 3 R/2 H | | 0.26 | 0.26 | 0.26 | 0.27 | 0.26 | 0.26 | 0.26 | 0.24 | 0.24 |
| Average particle diameter | μm | 11.6 | 11.6 | 11.6 | 11.1 | 11.7 | 11.6 | 11.7 | 11.6 | 11.6 |
| Particle diameter d10 | μm | 7.6 | 7.6 | 7.6 | 7.2 | 7.7 | 7.6 | 7.7 | 7.7 | 7.7 |
| Particle diameter d90 | μm | 17.5 | 17.5 | 17.5 | 17.1 | 17.9 | 17.5 | 17.9 | 17.5 | 17.5 |
| BET Specific surface area | m$^2$/g | 3.5 | 3.5 | 3.5 | 4.4 | 4.0 | 3.5 | 4.0 | 3.8 | 3.8 |
| Pore volume | ml/g | 0.74 | 0.74 | 0.74 | 0.75 | 0.69 | 0.74 | 0.69 | 0.62 | 0.62 |
| Coverage | % | 5.0 | 5.0 | 5.0 | 4.4 | 2.9 | 5.0 | 2.9 | 3.0 | 3.0 |
| Average degree of circularity of spheroidized graphitic particle before covering | | 0.909 | 0.909 | 0.909 | 0.909 | 0.909 | 0.909 | 0.909 | 0.909 | 0.909 |
| d002 of covering amorphous carbon alone | Å | 3.45 | 3.45 | 3.45 | 3.45 | 3.45 | 3.45 | 3.45 | 3.45 | 3.45 |
| Lc of covering amorphous carbon alone | Å | 24 | 24 | 24 | 24 | 24 | 24 | 24 | 22 | 22 |
| Properties of Carbon Material B | | | | | | | | | | |
| d002 | Å | 3.36 | 3.36 | 3.36 | 3.36 | 3.36 | — | — | — | 3.36 |
| Lc | Å | >1000 | >1000 | >1000 | >1000 | >1000 | — | — | — | >1000 |

TABLE 1-continued

| Items | Unit | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
| Raman R | | 0.13 | 0.13 | 0.13 | 0.13 | 0.13 | — | — | — | 0.10 |
| Tap density | q/cm$^3$ | 1.19 | 1.19 | 1.19 | 1.19 | 1.19 | — | — | — | 0.90 |
| Average particle diameter | μm | 13.1 | 13.1 | 13.1 | 13.1 | 13.1 | — | — | — | 10.6 |
| Particle diameter d10 | μm | 9.0 | 9.0 | 9.0 | 9.0 | 9.0 | — | — | — | 7.0 |
| Particle diameter d90 | μm | 19.5 | 19.5 | 19.5 | 19.5 | 19.5 | — | — | — | 16.2 |
| BET Specific surface area | m$^2$/g | 4.4 | 4.4 | 4.4 | 4.4 | 4.4 | — | — | — | 4.5 |
| Pore volume | ml/g | 0.46 | 0.46 | 0.46 | 0.46 | 0.46 | — | — | — | 0.77 |
| Coverage | % | 16.8 | 16.8 | 16.8 | 16.8 | 16.8 | — | — | — | 3.0 |
| Average degree of circularity of spheroidized graphitic particle before covering | | 0.919 | 0.919 | 0.919 | 0.919 | 0.919 | — | — | — | 0.909 |
| Mixed Carbon Material | | | | | | | | | | |
| Ratio of carbon material B based on total amount of carbon material A and carbon material B | Wt % | 30 | 50 | 70 | 50 | 50 | 0 | 0 | 0 | 50 |
| Average particle diameter ratio between carbon material A and carbon material B | | 0.89 | 0.89 | 0.89 | 0.85 | 0.89 | — | — | — | 1.09 |
| Press load | Kg | 240 | 230 | 230 | 200 | 230 | 320 | 250 | 400 | 250 |
| Rapid Discharge Characteristics | | | | | | | | | | |
| 0.2C Discharge capacity | mAh | 12.7 | 13.6 | 13.1 | 13.0 | 13.7 | 13.4 | 13.6 | 13.5 | 13.3 |
| 1C Discharge/0.2C discharge | % | 93 | 94.9 | 93 | 93 | 95 | 96 | 95 | 95 | 93 |
| 2C Discharge/0.2C discharge | % | 89 | 91.5 | 89 | 89 | 92 | 92 | 92 | 92 | 89 |
| 5C Discharge/0.2C discharge | % | 82 | 85.2 | 81 | 81 | 86 | 86 | 86 | 86 | 83 |
| 10C Discharge/0.2C discharge | % | 67 | 72.6 | 68 | 64 | 73 | 71 | 76 | 68 | 73 |
| 15C Discharge/0.2C discharge | % | 24 | 32 | 30 | 26 | 32 | 35 | 34 | 22 | 35 |
| Rapid Charge Characteristics | | | | | | | | | | |
| 0.2C-CCCV Charge capacity | mAh | 13.2 | 13.8 | 13.3 | 13.2 | 13.6 | 13.6 | 13.4 | 13.3 | 13.4 |
| 0.2C Charge/0.2C-CCCV Charge | % | 98 | 98 | 98 | 98 | 98 | 98 | 98 | 97 | 98 |
| 1C Charge/0.2C-CCCV Charge | % | 95 | 95 | 94 | 94 | 96 | 96 | 96 | 93 | 96 |
| 2C Charge/0.2C-CCCV Charge | % | 92 | 92 | 90 | 92 | 93 | 94 | 94 | 90 | 94 |
| 5C Charge/0.2C-CCCV Charge | % | 84 | 83 | 81 | 83 | 84 | 86 | 87 | 81 | 86 |
| 8C Charge/0.2C-CCCV Charge | % | 72 | 69 | 69 | 72 | 72 | 71 | 78 | 62 | 76 |
| 10C Charge/0.2C-CCCV Charge | % | 56 | 50 | 52 | 56 | 55 | 52 | 68 | 40 | 64 |
| Cycle Characteristics | | | | | | | | | | |
| 300-Cycles sustaining ratio | % | 55 | 65 | 93 | 93 | 65 | 36 | 23 | 20 | 22 |
| 500-Cycles sustaining ratio | % | 33 | 37 | 88 | 88 | 40 | 30 | 20 | 15 | 18 |

As seen in Table 1, in Examples 1 to 5 using the negative electrode material according to the present invention, excellent rapid charge-discharge characteristics and cycle characteristics are exhibited as compared with Comparative Examples 1 to 4 using a negative electrode material out of the scope of the present invention.

INDUSTRIAL APPLICABILITY

The nonaqueous electrolyte secondary battery comprising an electrode using the negative electrode material of the present invention exhibits an excellent performance satisfying both rapid charge-discharge characteristics and high cycle characteristics.

While the invention has been described in detail and with reference to specific embodiments thereof, it will be apparent to one skilled in the art that various changes and modifications can be made therein without departing from the spirit and scope of the invention.

This application is based on Japanese Patent Application (Patent Application No. 2009-079950) filed on Mar. 27, 2009, the entirety of which is incorporated herein by way of reference.

The invention claimed is:

1. A negative electrode material for nonaqueous electrolyte secondary battery, comprising the following carbon material A and carbon material B:

Carbon material A
   a multilayer-structure carbon material containing a graphitic particle and an amorphous carbon covering the surface of the graphitic particle, wherein the carbon material A has an interplanar spacing (d002) of 002 planes by the wide-angle X-ray diffraction method of 3.37 Å or less, an Lc of 900 Å or more, a tap density of 0.8 g/cm$^3$ or more, and a Raman R value that is a ratio of the peak intensity near 1,360 cm$^{-1}$ to the peak intensity near 1,580 cm$^{-1}$ in the argon ion laser Raman spectrum of from 0.25 to 0.6, Carbon material B
   wherein the carbon material B has an interplanar spacing (d002) of 002 planes by the wide-angle X-ray diffraction method of 3.37 Å or less, an Lc of 900 Å or more, a tap density of 0.8 g/cm$^3$ or more, and a Raman R value that is a ratio of the peak intensity near 1,360 cm$^{-1}$ to the peak intensity near 1,580 cm$^{-1}$ in the argon ion laser Raman spectrum of from 0.11 to 0.2, and wherein the carbon material (B) is a multilayer-structure carbon material containing a spheroidized graphitic particle and a graphitic carbon covering the surface of the spheroidized graphitic particle, wherein the ratio in the average particle diameter between the carbon material A and the carbon material B (average particle diameter of carbon material A/average particle diameter of carbon material B) is from 0.7 to 1.3.

2. The negative electrode material for nonaqueous electrolyte secondary battery as claimed in claim 1, wherein the ratio of the carbon material B is from 30 to 70 wt % based on the total amount of the carbon material A and the carbon material B.

3. The negative electrode material for nonaqueous electrolyte secondary battery as claimed in claim 1, wherein the graphitic particle in the carbon material A has an interplanar spacing (d002) of 002 planes by the wide-angle X-ray diffraction method of 3.37 Å or less, an Lc of 900 Å or more, a tap density of 0.8 g/cm$^3$ or more, and a Raman R value that is a ratio of the peak intensity near 1,360 cm$^{-1}$ to the peak intensity near 1,580 cm$^{-1}$ in the argon ion laser Raman spectrum of from 0.2 to 0.5.

4. The negative electrode material for nonaqueous electrolyte secondary battery as claimed in claim 1, wherein the spheroidized graphitic particle has an interplanar spacing (d002) of 002 planes by the wide-angle X-ray diffraction method of 3.37 Å or less, an Lc of 900 Å or more, a tap density of 0.8 g/cm$^3$ or more, and a Raman R value that is a ratio of the peak intensity near 1,360 cm$^{-1}$ to the peak intensity near 1,580 cm$^{-1}$ in the argon ion laser Raman spectrum of from 0.2 to 0.5.

5. The negative electrode material for nonaqueous electrolyte secondary battery as claimed in claim 1, wherein the specific surface area of the carbon material A is from 0.5 to 8 m$^2$/g.

6. The negative electrode material for nonaqueous electrolyte secondary battery as claimed in claim 1, wherein the average degree of circularity of the graphitic particle used for the carbon material A as determined by a flow-type particle analyzer is 0.88 or more.

7. The negative electrode material for nonaqueous electrolyte secondary battery as claimed in claim 1, wherein the average degree of circularity of a spheroidized graphitic particle in the carbon material B as determined by a flow-type particle analyzer is 0.88 or more.

8. The negative electrode material for nonaqueous electrolyte secondary battery as claimed in claim 1, wherein the pore volumes in the range of 10 to 100,000 nm of the carbon material A and the carbon material B as measured by the mercury intrusion method, are 0.4 ml/g or more.

9. The negative electrode material for nonaqueous electrolyte secondary battery as claimed in claim 1, wherein the average particle diameter of the carbon material A is from 2 to 30 μm.

10. A negative electrode for nonaqueous electrolyte secondary battery, comprising: a negative electrode layer containing the negative electrode material for nonaqueous electrolyte secondary battery claimed in claim 1 and a binder resin; and a current collector.

11. A nonaqueous electrolyte secondary battery comprising the negative electrode claimed in claim 10, a positive electrode capable of storing/releasing lithium ion, and a nonaqueous electrolytic solution.

12. The negative electrode material as claimed in claim 1, wherein the carbon material B is present in an amount of from 10 to 90 wt % based on the total weight of the carbon material A and the carbon material B.

13. The negative electrode material as claimed in claim 1, wherein the carbon material B is present in an amount of from 20 to 80 wt % based on the total weight of the carbon material A and the carbon material B.

14. The negative electrode material as claimed in claim 1, wherein the carbon material B is present in an amount of from 30 to 70 wt % based on the total weight of the carbon material A and the carbon material B.

15. The negative electrode material as claimed in claim 1, wherein the Raman R value of the carbon material B is from 0.11 to 0.13.

16. The negative electrode material for nonaqueous electrolyte secondary battery as claimed in claim 1, wherein the ratio of carbon material (B) is from 20 to 80 wt % based on the total amount of the carbon material (A) and the carbon material (B).

17. The negative electrode material for nonaqueous electrolyte secondary battery as claimed in claim 1, wherein the ratio in the average particle diameter between the carbon material (A) and the carbon material (B) is from 0.8 to 1.2.

18. The negative electrode material for nonaqueous electrolyte secondary battery as claimed in claim 1, wherein the ratio of the carbon material (B) is from 30 to 50 wt % based on the total amount of the carbon material (A) and the carbon material (B).

19. The negative electrode material for nonaqueous electrolyte secondary battery as claimed in claim 1, wherein the ratio of the carbon material (B) is from 50 to 70 wt % based on the total amount of the carbon material (A) and the carbon material (B).

20. The negative electrode material for nonaqueous electrolyte secondary battery as claimed in claim 1, wherein the ratio in the average particle diameter between the carbon material (A) and the carbon material (B) is from 0.7 to 0.89.

* * * * *